W. FRITZ.
PACKING AND BUSHING.
APPLICATION FILED MAR. 25, 1912.
1,095,840.
Patented May 5, 1914.
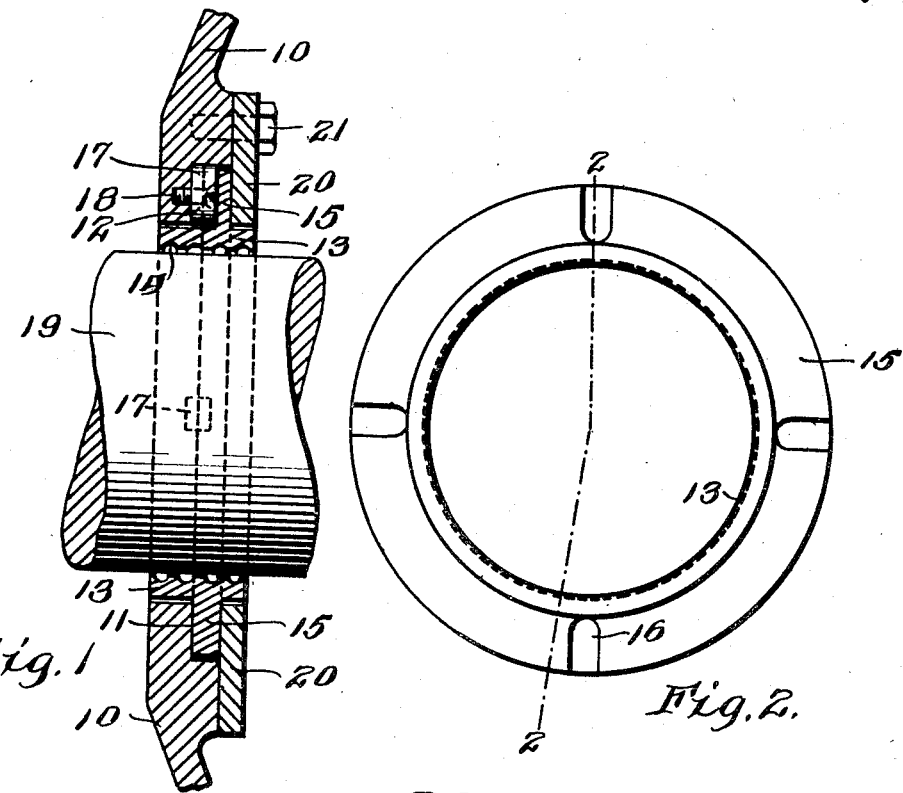
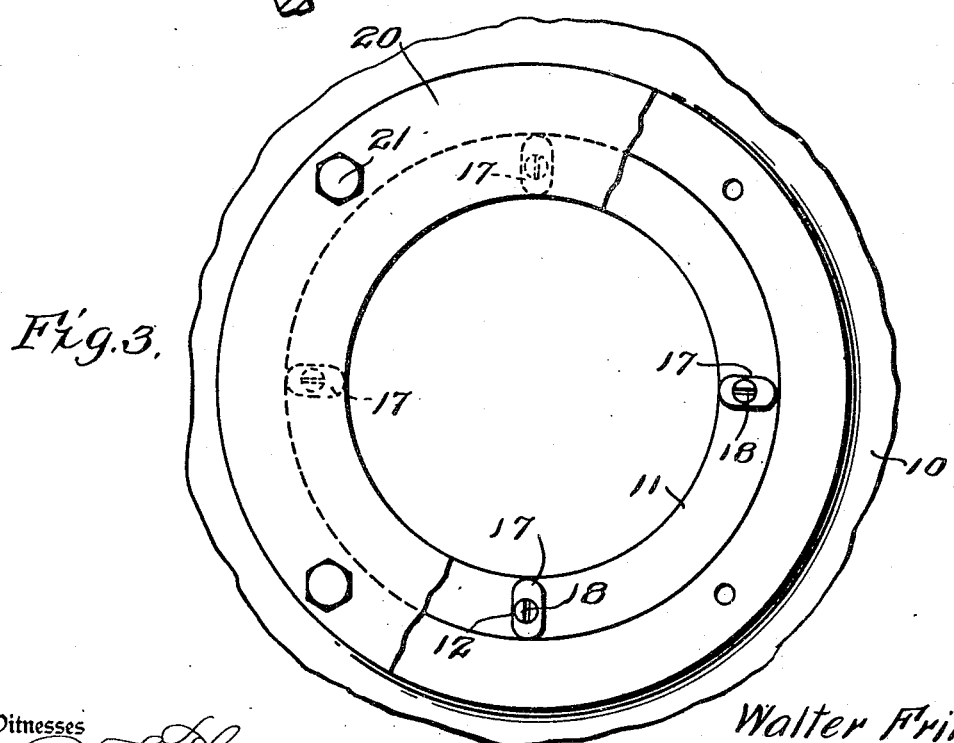

UNITED STATES PATENT OFFICE.

WALTER FRITZ, OF BERLIN, GERMANY, ASSIGNOR TO BERGMANN-ELEKTRICITATS-WERKE, OF BERLIN, GERMANY, A CORPORATION.

PACKING AND BUSHING.

1,095,840.  Specification of Letters Patent.  Patented May 5, 1914.

Application filed March 25, 1912. Serial No. 686,114.

*To all whom it may concern:*

Be it known that I, WALTER FRITZ, a subject of the Emperor of Germany, residing at Berlin, in the Empire of Germany, have invented certain new and useful Improvements in Packings and Bushings; and I do hereby declare the following to be a full, clear, and exact description of the invention, such as will enable others skilled in the art to which it appertains to make and use the same.

My invention relates to the packing and bushings of turbine engines and the like and has for an object to provide means for the difference of expansion between the packing and the moving part.

Another object is to provide a bushing which is centered with respect to the moving part under all conditions.

A further object of my invention is to provide for the expansion of a bushing and to keep the part moving through the bushing centered when the several parts are chilled or contracted.

Further objects will be apparent from the following specification, appended claims and drawings, in which—

Figure 1 is a vertical sectional view as on the line 2—2 of Fig. 2. Fig. 2 is an elevation of the bushing and Fig. 3 is an end elevation of the device with parts broken away.

In the construction of bushings and packing rings for use with turbine or other engines of which the several parts are subjected to various temperatures it is necessary that some provision be made to permit the proper expansion of the white metal or bronze bushing as the coefficient of expansion thereof is approximately double that of iron. In the provision for expansion it is further necessary that all expansion is radially and that the contraction due to reduced temperature does not permit the moving part to get out of alinement.

In order to facilitate in the above requirements I provide the usual opening in the end of the cylinder 10 as usual and said opening is cut to two dimensions to produce a shoulder 11, which shoulder is provided at equidistant points thereabout with pockets 12 which may have their outer ends rounded if so desired.

A bushing 13 provided with the usual lubricating rings 14 and having the flange 15 thereabout is inserted in the opening in the cylinder or the like and the flange 15 is intended to bear against the shoulder 11. The flange 15 is provided with pockets 16 to coincide with the pockets 12 when the ring is in position and said pockets may have their inner end rounded as such a cut is more easily milled. Keys 17 are adapted to be inserted in the pockets 12 and screws 18 hold the same in place. Lugs may be cast to serve the purpose of the keys 17 but such a construction would be more difficult and cast iron lugs would not wear as well as steel. The keys 17 engage the pockets in the end of the cylinder and the flange of the bushing and it is evident that these keys when properly set, hold the bushing so that the center remains constant as any expansion must be radial. I further provide an interstice between the shaft or piston rod 19 and the bushing and between the peripheries of the bushing and housing so that said bushing may expand without buckling or jamming. The parts when assembled are held in place by a retaining ring 20 which is secured to the housing by bolts 21.

The operation of my device is obvious from the foregoing and I do not restrict myself to the insertible keys but may use lugs cast integral with one of the parts to engage the other and

Having thus described my invention, I claim:—

1. In a bushing, an anti-friction ring surrounding a moving part, a housing supporting said ring, said ring having a flange thereabout, said flange being radially slotted at spaced points and keys rigidly carried by said housing engaging said slots.

2. In a bushing, an anti-friction bushing, a flange formed integral therewith having radial slots at spaced points, a housing surrounding said bushing, said housing having a shoulder to abut said flange, ribs on the face of said shoulder engaging in the slots in the flange, and a retaining ring for the flange.

In testimony whereof I affix my signature in presence of two witnesses.

WALTER FRITZ.

Witnesses:
 HENRY HASPER,
 WOLDEMAR HAUPT.